United States Patent
Sramka et al.

(10) Patent No.: US 9,866,654 B2
(45) Date of Patent: *Jan. 9, 2018

(54) MANAGING COMMUNICATIONS IN A MULTI-CLIENT; MULTI-SERVER ENVIRONMENT

(71) Applicant: Toshiba Global Commerce Solutions Holdings Corporation, Tokyo (JP)

(72) Inventors: Peter Sramka, Raleigh, NC (US); Luis Lopez, Raleigh, NC (US); Bradley T. Marchesseault, Cary, NC (US); Zachary McCain Darden, Morrisville, NC (US)

(73) Assignee: Toshiba Global Commerce Solutions Holdings Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/455,698

(22) Filed: Mar. 10, 2017

(65) Prior Publication Data
US 2017/0187843 A1    Jun. 29, 2017

Related U.S. Application Data

(63) Continuation of application No. 14/230,130, filed on Mar. 31, 2014, now Pat. No. 9,596,297.

(60) Provisional application No. 61/896,328, filed on Oct. 28, 2013, provisional application No. 61/824,351, filed on May 13, 2013.

(51) Int. Cl.
*H04L 29/06*    (2006.01)
*H04L 29/08*    (2006.01)

(52) U.S. Cl.
CPC .......... *H04L 67/42* (2013.01); *H04L 65/1006* (2013.01); *H04L 67/10* (2013.01); *H04L 67/141* (2013.01); *H04L 67/143* (2013.01); *H04L 67/146* (2013.01); *H04L 67/2842* (2013.01); *H04L 67/2852* (2013.01)

(58) Field of Classification Search
CPC .................................................. H04L 65/1006
See application file for complete search history.

(56) References Cited

U.S. PATENT DOCUMENTS 7,983,240 B2 *  7/2011  Jansson ............... H04L 27/2601
                                                       370/351
8,140,580 B2 *  3/2012  Rehm .................. G06F 11/3636
                                                       707/791

* cited by examiner

*Primary Examiner* — Adnan Mirza
(74) *Attorney, Agent, or Firm* — Coats & Bennett, PLLC

(57) ABSTRACT

According to one aspect of the present disclosure, a method is implemented by a server in a server cluster. A request received from a client includes a session identifier (ID) identifying a session between the client and the server, and a correlation ID that is linked to the request. If the correlation ID is not included in an individual server-specific session microcache for the session, the request is processed to determine a response, the response is added to the session microcache, and the response and an indication of the correlation ID are sent to the client. If the correlation ID and a response to the request are stored in the session microcache, the response and an indication of the correlation ID are re-sent to the client. The session ID and session microcache are transferred to another of the plurality of servers in the server cluster to continue the session.

20 Claims, 8 Drawing Sheets

| | C-ID | TIMESTAMP | RESPONSE |
|---|---|---|---|
| 26A → | 10582730 | 2014-01-15  10:45 AM | "LOGIN FAILED" FOR C-ID 10582730 |
| 26B → | 10582731 | 2014-01-15  10:46 AM | "LOGIN SUCCESS" FOR C-ID 10582731 |
| 26C → | 10582732 | 2014-01-15  10:46 AM | "39.95", "BACKORDERED" FOR C-ID 10582732 |
| 26D → | 10582733 | 2014-01-15  10:47 AM | "4.99", "SUCCESS" FOR C-ID 10582733 |

*FIG. 3*

| C-ID |
|---|
| 10582720 |
| 10582721 |
| 10582722 |
| 10582723 |
| 10582724 |
| 10582725 |
| 10582726 |
| 10582727 |
| 10582728 |
| 10582729 |

*FIG. 4*

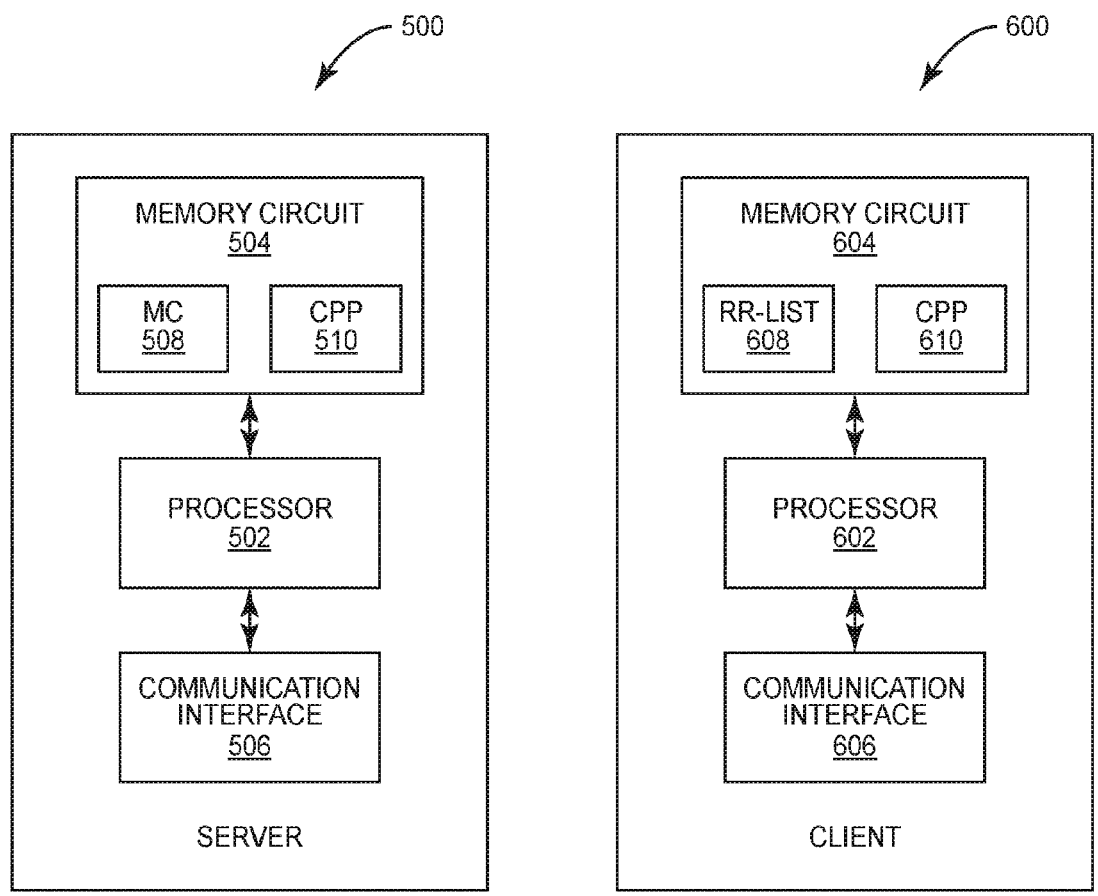
*FIG. 8*     *FIG. 9* and microcache are transferred to another server of the plurality of servers in the server cluster to continue the session.

MANAGING COMMUNICATIONS IN A MULTI-CLIENT; MULTI-SERVER ENVIRONMENT

RELATED APPLICATIONS

This application is a continuation application of U.S. Ser. No. 14/230,130, filed Mar. 31, 2014, which claims the benefit of U.S. Provisional Application No. 61/896,328, filed Oct. 28, 2013, and U.S. Provisional Application No. 61/824,351, filed May 16, 2013, each of which is incorporated herein by reference in their entirety.

TECHNICAL FIELD

The present disclosure relates to managing client-server communications, and more particularly, to techniques that can provide for idempotence in processing client requests in a multi-client, multi-server environment through the use of a server-specific session microcache.

BACKGROUND

Communications over the Internet and various other data networks can be inherently unreliable. Consider a client communicating with a remote server over the Internet. If the client sends a request to the server that contains a command, the client may receive a response which indicates that the command was processed. Alternatively, the client may receive no response at all. If the client receives no response from the server, the client will be unsure as to which of the following is true: (1) the request was never received by the server, (2) the request was received by the server and the command is still being processed, or (3) the request was received by the server and the command has been processed, but the response was unsuccessfully transmitted to the client.

This can be problematic in a wide variety of applications. Consider, for example, that a client transmits a request to "charge John Smith's credit card $250," but does not receive a response. In this scenario, the client may send the request again, which may cause the server to process the request twice, such that the customer is charged $500 for $250 worth of product. Alternatively, the client may not re-send the request, which may result in the customer paying nothing for $250 worth of product in the case that the server never received the request.

SUMMARY

According to one aspect of the present disclosure, a method of processing a request received from a client is disclosed. The method is implemented by one of a plurality of servers in a server cluster. A request is received from the client that includes a session identifier (ID) identifying a session between the client and the server, and a correlation ID that is linked to the request. A determination is made of whether the correlation ID is included in an individual server-specific session microcache of the session. If the correlation ID is not included in the session microcache, the request is processed to determine a response, the response is added to the session microcache, and the response is sent along with an indication of the correlation ID to the client. If the correlation ID and a response to the request are stored in the session microcache, the response along with an indication of the correlation ID are re-sent to the client. The session ID and session microcache are transferred to another of the plurality of servers in the server cluster to continue the session.

According to another aspect of the present disclosure, a method implemented by a client is disclosed. The client generates a request that includes: a session ID that identifies a session between the client and one of a plurality of servers of a server cluster, a correlation ID that is linked to the request, and a response list that contains correlation IDs linked to responses received from one or more servers of the server cluster for requests submitted by the client as part of the session. The client sends the request to the server. If a response to the request is not received within a predefined time period, the request is re-sent to the same or another server of the server cluster. If a response to the request is received within the predefined time period, the response list is updated to include the correlation ID, and the updated response list is sent to the same or another server of the server cluster.

According to another aspect of the present disclosure, a server that is part of a server cluster which includes a plurality of other servers is disclosed. The server includes a memory circuit configured to store an individual server-specific session microcache for a session between the server and a client. The server also includes one or more processing circuits configured to receive a request from the client that includes: a session ID identifying a session between the client and the server, and a correlation ID that is linked to the request. The one or more processing circuits are further configured to determine whether the correlation ID is included in the session microcache. The one or more processing circuits are further configured to, if the correlation ID is not included in the session microcache: process the request to determine a response, add the response to the session microcache, and send the response along with an indication of the correlation ID to the client. The one or more processing circuits are further configured to, if the correlation ID and a response to the request are stored in the session microcache, re-send the response along with an indication of the correlation ID to the client. The one or more processing circuits are further configured to transfer the session ID and session microcache to another of the plurality of servers in the server cluster to continue the session.

According to another aspect of the present disclosure, a client is disclosed that includes a memory circuit and one or more processing circuits. The one or more processing circuits are configured to generate a request that includes: a session ID that identifies a session between the client and one of a plurality of servers of a server cluster, a correlation ID that is linked to the request, and a response list that contains correlation IDs linked to responses received from one or more servers of the server cluster for requests submitted by the client as part of the session. The one or more processing circuits are further configured to send the request to the server. The one or more processing circuits are configured to, if a response to the request is not received within a predefined time period, re-send the request to the same or another server in the server cluster. The one or more processing circuits are further configured to, if a response to the request is received within the predefined time period, update the response list to include the correlation ID, and send the updated response list to the same or another server in the server cluster. The memory circuit is configured to store the response list.

Of course, the present disclosure is not limited to the above features and advantages. Indeed, those skilled in the art will recognize additional features and advantages upon reading the following detailed description, and upon viewing the accompanying drawings.

BRIEF DESCRIPTION OF THE DRAWINGS

FIG. 3 illustrates an example microcache.

FIG. 4 illustrates an example received response list.

FIG. 8 is a block diagram of an example server.

FIG. 9 is a block diagram of an example client.

DETAILED DESCRIPTION

The present disclosure describes techniques for managing communications between a client and a server cluster in a multi-client, multi-server environment. In some embodiments, a server-specific session microcache is used by a server in a server cluster. Responses to requests from a client are stored in the session microcache. Once the server learns that the client has received a given response, the response is deleted from the session microcache. If the request is re-submitted to the same or another server in the server cluster, that server can re-send the response from the session microcache to the client instead of reprocessing the request.

In some embodiments, a client maintains a received response list that indicates which responses it has received from one or more servers in the server cluster for requests submitted by the client as part of the session. The list is transmitted to a server of the server cluster so that the server can identify which responses the client has received as part of the session.

Figure 1:
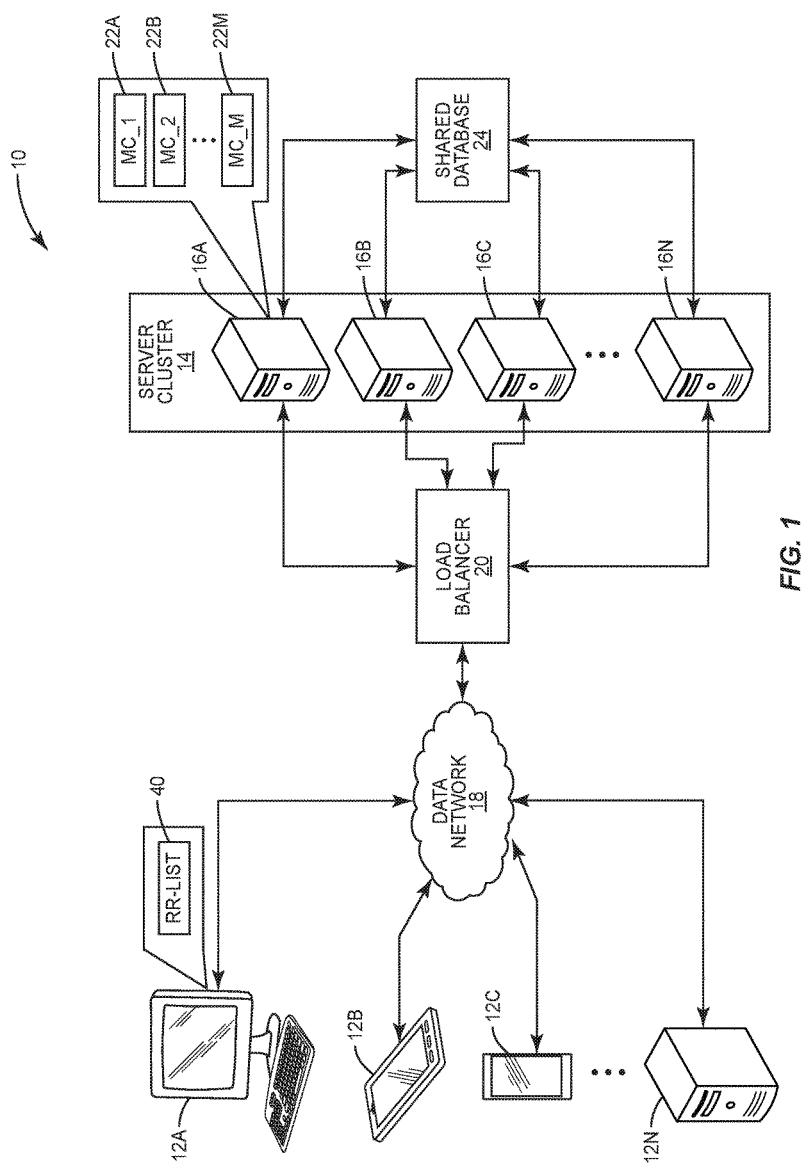
FIG. 1 illustrates an example multi-client, multi-server environment.

FIG. 1 illustrates an example multi-client, multi-server environment 10, which is a computer system in which multiple clients 12A-N communicate with a server cluster 14. The server cluster 14 includes a plurality of similarly configured servers 16A-N that are each configured to perform one or more common functions. The responsibility for conducting and maintaining a particular session with a given one of the clients 12 may be moved from server to server during the course of a session. Thus, a given one of the clients 12 may communicate with one or more of the servers 16 during a given session. However, only one server 16 is ever responsible for conducting and maintaining a particular session with a client 12 at any single point in time (herein referred to as "supporting" the session). In one or more embodiments, transfer of a session from being supported by a first one of the servers 16 to a second one of the servers 16 is performed such that users of the client 12 and/or the client 12 itself are unaware of the session transfer. Each server 16 may be a physical device, or may be a virtual device that runs on a physical device.

The servers 16 in the server cluster 14 communicate with each other over a network (e.g., a local area network "LAN"). The servers 16 communicate with the clients 12 via a data network 18, which may be a LAN or a wide area network (WAN), such as the Internet. In one or more embodiments, a load balancer 20 manages the server cluster 14. In one example, the load balancer 20 decides which of the servers 16 will support a new session with a given one of the clients. Once a session is initiated, the session is supported by a single server 16, unless the session is transferred to another one of the servers 16. If a load on a given one of the servers 16 exceeds a threshold, then the load balancer 20 transfers one or more sessions from the overloaded server to another server in the cluster 14. The load balancer 20 may comprise a dedicated piece of hardware that is separate from the server cluster 14, or may reside within one or more of the servers 16 in the server cluster 14 (e.g., as software that executes on one or more of the servers 16), for example.

The clients 12 communicate with the servers 16 within sessions. For example, a client 12 may initiate a session by attempting to login to a given one of the servers 16. The client 12 can then interact with the server 16 during the session by submitting requests (e.g., for information about an item for sale, or to purchase the item for sale). Each session includes a series of one or more related request-response exchanges between a single client 12 and one or more servers 16 of the server cluster 14. For example, a session related to a point of sale client purchasing an item could include the following request-response exchanges:

A) Request: client asks to login to server, and supplies user ID and password as command parameters.
   Response: access granted.
B) Request: client asks for a list of all recent purchases.
   Response: list of my recent purchases provided.
C) Request: client asks what the current price is of an item.
   Response: indication that the item costs $39.99.
D) Request: client asks to add item to shopping cart.
   Response: item added to shopping cart.
E) Request: client asks to sign off.
   Response: sign off completed.

If at some point during the session described above the load on the server 16 supporting the session exceeded a load threshold, then the session may be transferred to another server 16 in the server cluster 14 based on a determination by the load balancer 20.

In one or more embodiments, the clients 12 are unaware of which server 16 in the cluster 14 they are communicating with. Consider an example in which each of the servers 16 is a web server that provides the same website to the clients 12. Users of the clients 12 may be aware that they are communicating with a given entity (e.g., an e-commerce website) but may be unaware of which server of that website they are interacting with.

The clients 12A-N may include a wide variety of devices, some of which are illustrated as non-limiting examples in FIG. 1. For example, client 12A is a desktop computer, client 12B is a tablet computer, client 12C is a smartphone, and client 12N is an unmanned computer (e.g., a headless server or an unmanned robot). The unmanned computer 12N may conduct entire sessions with one or more servers 16 of the server cluster 14 without any user interaction. Each client 12 may be a physical device, or may be a virtual device that runs on a physical device (i.e., a virtual machine). Although only a single one of each of the clients 12A-N is shown, it is understood that these are only non-limiting examples, and that any variety of clients could be used (including, e.g., many of a single type of client 12). Also, while the computers 12A-C may involve user interaction during a given session, some computers such as unmanned computer 12N may not require user interaction during a session.

In computer science, the term "idempotent" is used to describe an operation that will produce the same results if executed once or multiple times. A lack of idempotence can be problematic if, for example, a client attempts to purchase the same item twice when only a single purchase is intended. Techniques described herein can convert inherently non-idempotent client/server operations into idempotent operations to address such issues through use of a session microcache.

Each server 16 that supports a session includes a session microcache 22 for that session. The session microcache 22 is a collection of responses to requests most recently sent by the server cluster 14 to a given client 12 for a particular session (i.e., sent by the server 16 in the cluster 14 that supports the session, and optionally one or more additional servers 16 in the cluster 14 that previously supported the session). Thus each session conducted and maintained by the server cluster 14 has its own response microcache. Referring to FIG. 1, in one example, session microcache 22A corresponds to a session between server 16A and client 12A, session microcache 22B corresponds to a session between server 16A and client 12B, and session microcache 22M corresponds to a session between server 16A and client 12C.

At any given time the session microcache 22 is managed by a single one of the servers 16 (i.e., the server that supports the session). However, if a session is transferred from being supported by a first server 16 of the cluster to a second server 16 of the cluster, the microcache is transferred to the second server 16, and the first server no longer manages the microcache. In some embodiments, the microcache is only stored on a single one of the servers 16 at a given time. In other embodiments, the same microcache is stored on a server 16 supporting a session, and one or more backup copies of the microcache are stored on one or more other servers 16 in the cluster 14 (e.g., in case the server 16 supporting the session crashes).

In some embodiments, the servers 16 may optionally store some information in a shared database 24. For example, an e-commerce website may store some long term data (e.g., customer name and address information, customer order histories, etc.) in a shared database 24. However, in such embodiments the individual session microcaches are not stored in the shared database 24.

Figure 2:
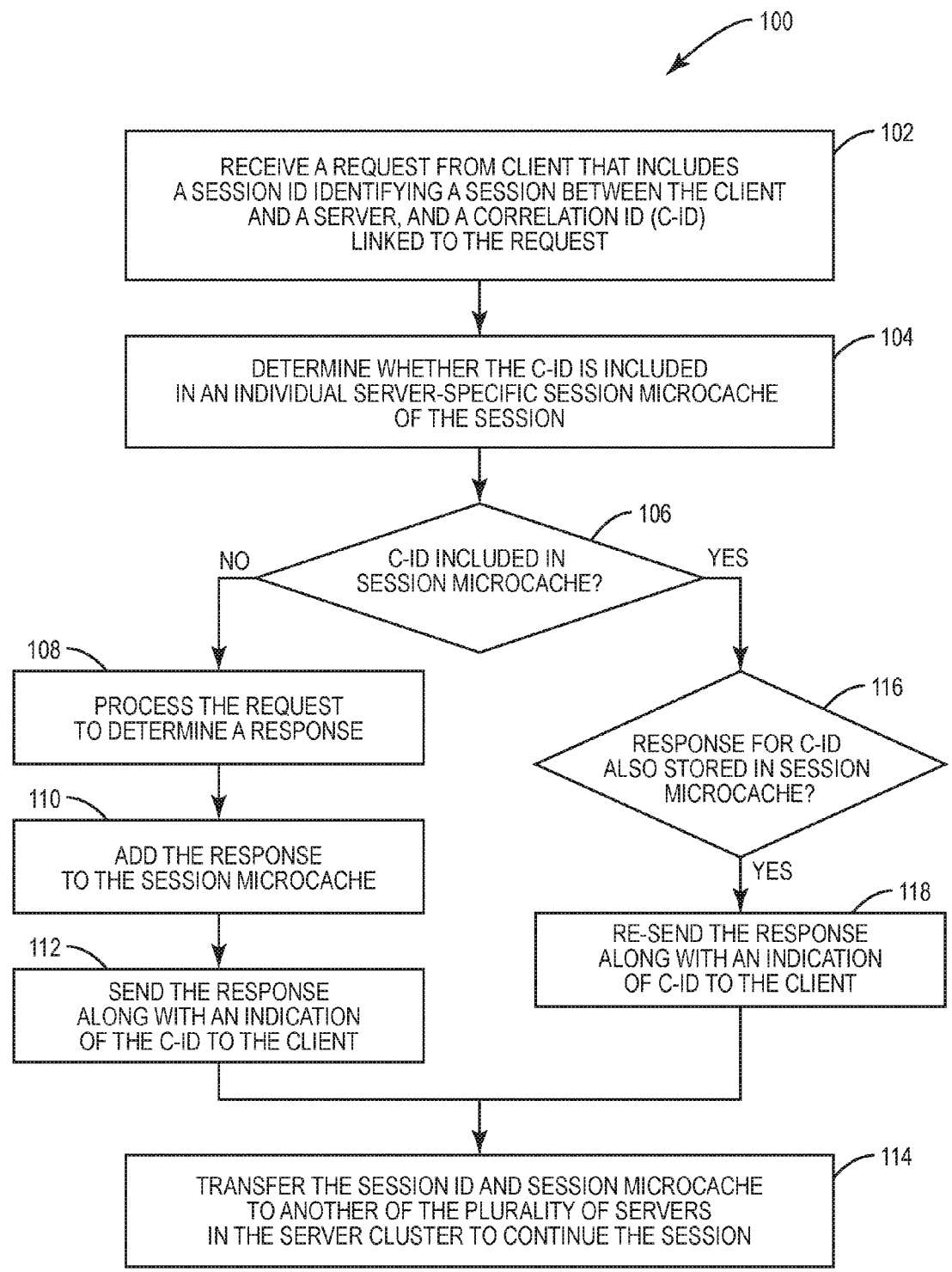
FIG. 2 is a flowchart of a method implemented by one of a plurality of servers in a server cluster.

FIG. 2 is a flowchart of a method 100 implemented by one of the plurality of servers 16 in server cluster 14 to process a request received from a client 12. The server 16 receives a request from one of the clients 12 (block 102). The request includes a session identifier (ID) identifying a session between the client 12 and the server 16, and a correlation ID that is linked to the request. The server 16 determines whether the correlation ID is included in an individual server-specific session microcache of the session (block 104). If the correlation ID is not included in the session microcache (a "no" to block 106), the request is processed to determine a response (block 108), the response is added to the session microcache (block 110), and the response is sent along with an indication of the correlation ID to the client (block 112). If the correlation ID and a response to the request are stored in the session microcache (a "yes" to both of blocks 106 and 116), then the response and an indication of the correlation ID for the response are re-sent to the client (block 118). The session ID and session microcache are transferred to another of the plurality of servers 16 in the server cluster 14 to continue the session (block 114).

The correlation ID is a unique identifier that is used to associate a request with its corresponding response. In one or more embodiments, the "indication" of the correlation ID of block 112 and/or block 118 is identical to the received correlation ID of block 102, such that a request and its corresponding response each include the same correlation ID. In one or more embodiments, the "indication" of the correlation ID is an abbreviated version of the received correlation ID, and/or is derived from the received correlation ID. For example, if the correlation ID was a concatenation of a client identifier with a unique identifier, in one or more embodiments the "indication" of the correlation ID could include just the unique identifier portion (and not the client identifier). A new correlation ID is generated by a client 12 for each newly created request. In one or more embodiments, old correlation IDs may be reused once a session is over.

Each microcache is dedicated to a single session, and is server-specific (i.e., only needs to be stored on the server supporting the session). As an example, a plurality of microcaches 22 are shown in FIG. 1, each corresponding to a session supported by the server 16A. In some embodiments, upon termination of a session (e.g., a user logging off of an e-commerce website), the microcache for that session is deleted. Although microcaches may be duplicated on other ones of the servers 16 for backup purposes (e.g., in case a given server 16 supporting a session crashes), the session microcaches are still considered to be "server-specific" in that a given microcache is only maintained for non-backup purposes by a single server 16 at a given time.

By using a microcache 22 for a given session, idempotence can be provided because a request from a client 12 to a given one of the servers 16, if provided with the same correlation ID, will yield the same result. Thus, for example, a request to add an item to an electronic shopping cart, when sent twice within a session using the same correlation ID each time, will result in the item being added to the cart only once.

As discussed above, the request from the client (block 102) includes a session ID, and includes a correlation ID that is linked to the request. The request received from the client also asks that the server perform some action. This may take the form of a command, for example. In some embodiments, the request also includes command parameters for the command. As discussed below in greater detail, client requests may also include a received response list. In one or more embodiments, the request that is sent from the client 12 to the server 16 is generated by the client 12. The response from the server 16 (block 112 or block 118) is a response to the request from the client 12. In some embodiments, it contains a response to the command contained in the request, and an indication of the correlation identifier that was included in the request.

FIG. 3 illustrates an example microcache 22. The microcache 22 includes a plurality of records 26A-D, each entered for a single session between a given one of the plurality of clients 12 and a given one of the plurality of servers 16. In the example of FIG. 3, each record includes a correlation ID (shown as "C-ID") 28, a timestamp 30 corresponding to the creation time of the record 26, and a response 32 that includes an indication of the correlation ID of the request (in the example of FIG. 3, the indication of the correlation ID is the actual correlation ID itself). The first record 26A corresponds to a failed login attempt (e.g., a failed login attempt to an e-commerce website), and includes a response of "Login Failed" for C-ID 10582730. A second record 26B corresponds to a successful login attempt, and includes a response of "Login Success" for C-ID 10582731. A third record 26C corresponds to an attempt to add an item to a shopping cart. The response for record 26C indicates that it is for C-ID 10582732 and the price of the item is $39.99 but that the item is backordered. A fourth record 26D corresponds to an attempt to add another item to a shopping cart. The response for record 26D indicates that it is for C-ID 10582733, that the price of the item is $4.99, and that the item was successfully added to the shopping cart. Although each response 32 is shown as including the correlation ID in FIG. 3, it is understood that in some embodiments the response 32 determined in block 108 may omit the correlation ID, and then when the response is transmitted to the client (block 112 or block 118) that the determined response would be transmitted along with an indication of the correlation ID (based on the correlation ID 28 stored in the record 26 for the response).

FIG. 4 illustrates an example received response list 40 that contains correlation IDs linked to responses received by a client 12 during a session from one or more servers 16 of the server cluster 14 for requests submitted by the client as part of the session. In some embodiments, each client 12 participating in a session with one of the servers 16 maintains a respective received response list 40 for their respective session. In some embodiments, the received response list includes a list of correlation IDs of the most recently received responses received by a particular client from one or more servers 16 of the server cluster 14 during a given session between the client and the one or more servers 16 of the server cluster 14. In one example, each received response is from a single server 16 in the cluster 14. In one example, some received responses in the list 40 are for responses from a first server 16 that initially supported the session, and other received responses in the list 40 are for responses from a second server 16 that subsequently supported the session. Use of the received response list 40 will be discussed in greater detail below.

Figure 5:
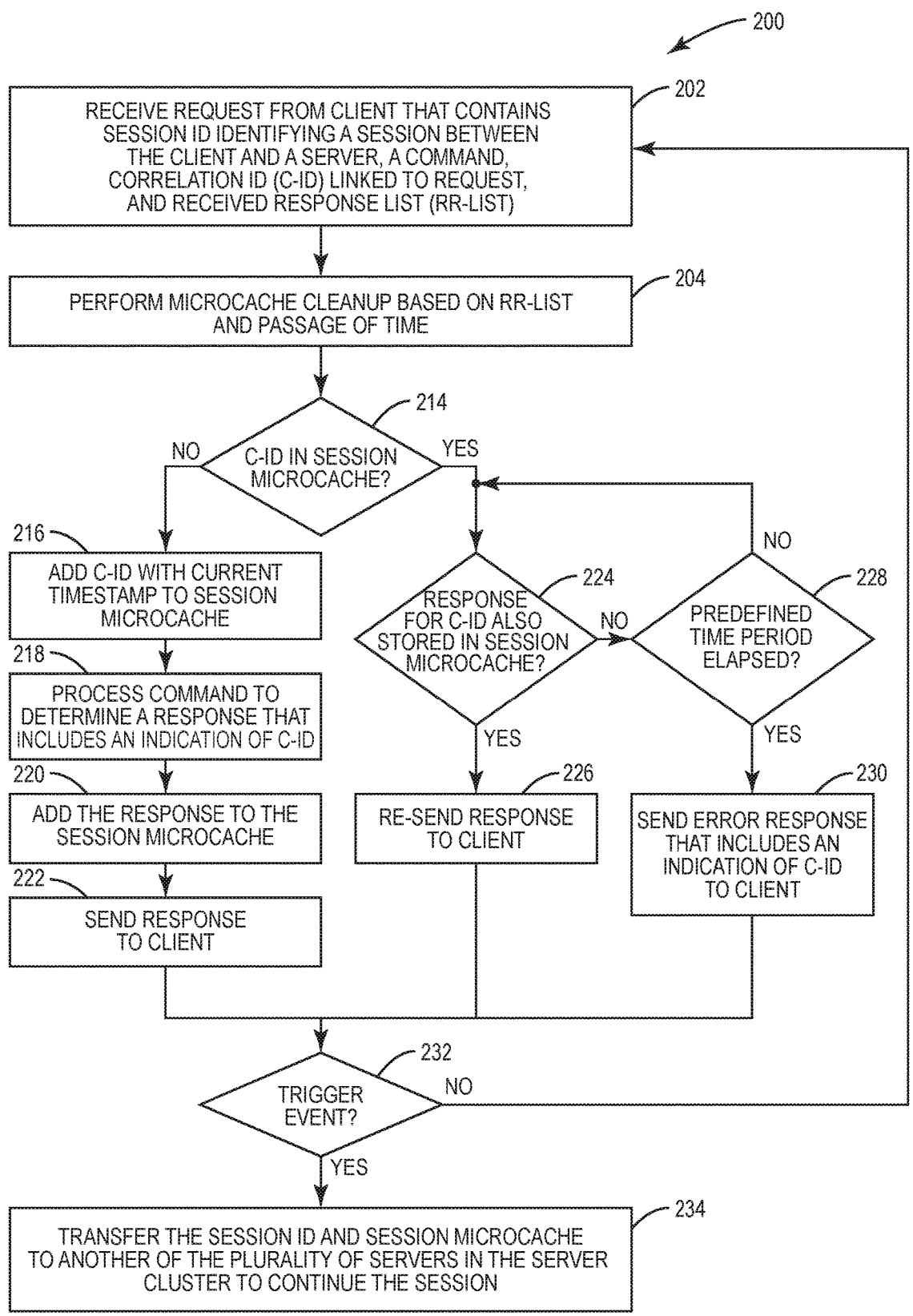
FIG. 5 is a flowchart of an example implementation of the method of FIG. 2.

FIG. 5 is a flowchart of an example implementation 200 of the method 100 of FIG. 2. A request is received from a client 12 that contains a session ID identifying a session between the client 12 and a server 16 in the server cluster 14, a command, a correlation ID linked to the request, and a received response list (block 202). A microcache cleanup is performed based on the received response list and the passage of time (block 204).

A determination is made of whether the correlation ID is stored in the session microcache 22 (block 214). If the correlation ID is not stored in the session microcache (a "no" to block 214), indicating that the request has not been previously received, the correlation ID and a current timestamp are added to the session microcache 22 (block 216). The command is processed to determine a response that includes an indication of the correlation ID of the request (block 218), the response (which includes an indication of the correlation ID) is added to the session microcache (block 220), and the response is sent to the client (block 222).

Otherwise, if the correlation ID of the request is stored in the session microcache 22 (a "yes" to block 214), this indicates that the command was previously received and that the request received in block 202 is a duplicate request. In this case, a determination is made of whether a response for that correlation ID is also stored in the session microcache 22 (block 224). If the response is stored in the session microcache 22 (a "yes" to block 224), the response (which includes an indication of the correlation ID) is re-sent to the client 12 (block 226).

If the correlation ID of the request is in the session microcache (a "yes" to block 214) but the response is not stored in the session microcache 22 (a "no" to block 224), this indicates that the command of the duplicate request is still being performed. In this case, a determination is made of whether a predefined time period has elapsed (block 228).

If the predefined time period has not elapsed (a "no" to block 228), then the server 16 continues to wait for completion of the command. Otherwise, if the predefined time period has elapsed (a "yes" to block 228), then the server 16 sends an error response that includes an indication of the correlation ID of the request to the client 12 participating in the session (block 230). Thus, in one or more embodiments the server 16 starts a timer based on a duplicate request being received, and if a response to the duplicate request is not available after the timer indicates that a predefined time period has transpired, the server 16 sends an error response that includes an indication of the correlation ID for the request to the client 12.

One reason that a response may not be available despite the correlation ID being stored in the microcache 22 is that a command may involve a complex computation, or may involve obtaining data from an external data source over a connection that experiences some degree of latency.

If a trigger event occurs (a "yes" to block 232), the server transfers the session ID and the session microcache 22 to another one of the plurality of servers 16 in the server cluster 14 to continue the session (block 234). An example trigger event could include a load on the server 16 supporting the session exceeding a load threshold, and that server 16 either unilaterally transferring the session to another server 16, or requesting that the load balancer 20 transfer the session to another server 16. If no trigger event is experienced, the server 16 waits to receive another request, and proceeds to block 202 when another request is received.

Figure 5A:
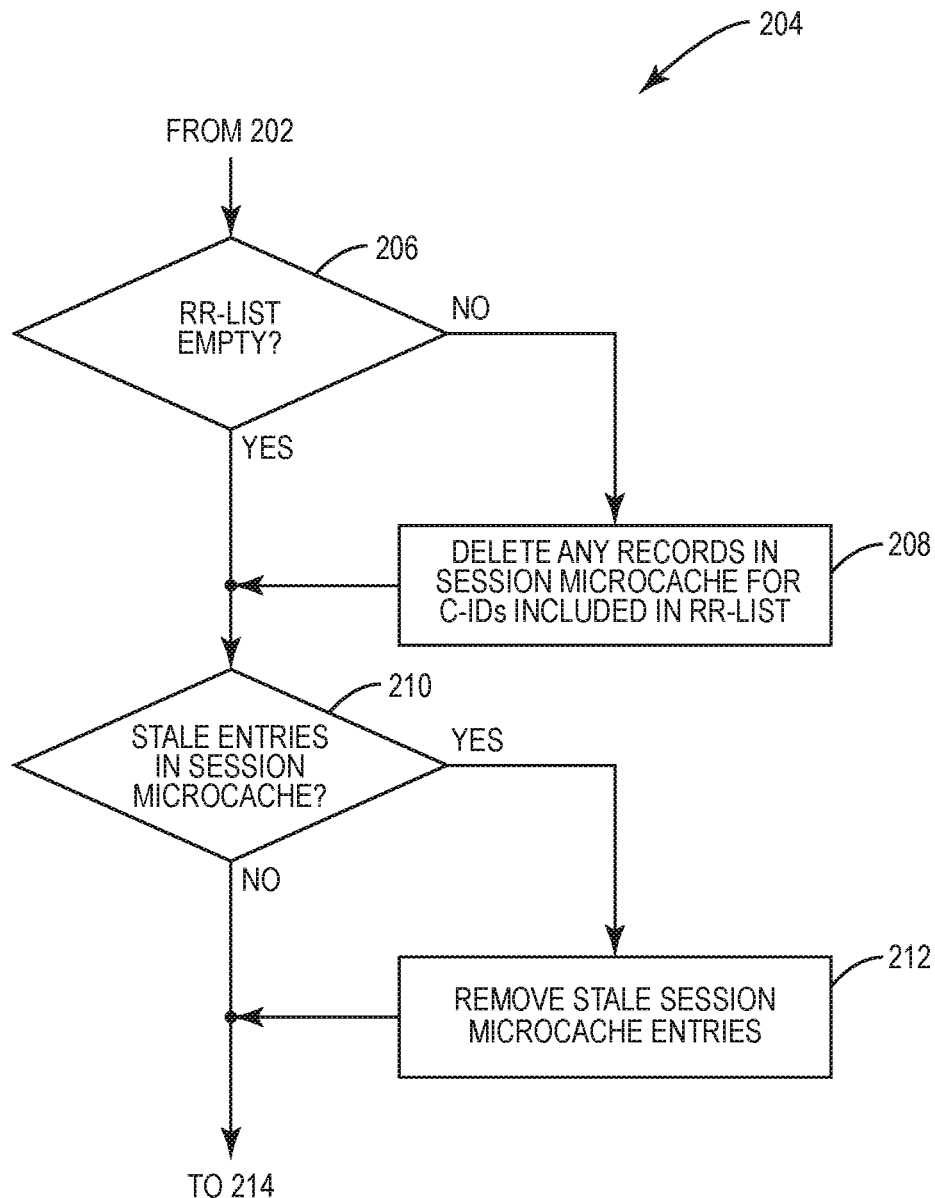
FIG. 5A is a flowchart of a microcache cleanup method.

FIG. 5A is a flowchart illustrating an example microcache cleanup method that can be used for block 204. A check is performed to determine if the received response list is empty (block 206). If the received response list is not empty (a "no" to block 206), the server deletes response records 26 in the session microcache 22 for any correlation IDs included in the received response list (block 208), and the method proceeds to block 210. If the received response list is empty (a "yes" to block 206), then the method proceeds to block 210.

Thus, according to the example of FIG. 5A, the response list 40 that is received from the client 12 contains correlation IDs linked to responses that have been received at the client 12 from one or more servers 16 of the server cluster 14 for requests submitted as part of the session (see, e.g., FIG. 4), and if responses for any of the correlation IDs in the response list 40 are stored in the session microcache 22, those responses are deleted from the session microcache 22. As discussed above, it is understood that the response list 40 could include responses received from not only the server 16 performing method 200, but also from one or more additional servers 16 in the server cluster 14 that previously supported the session before transferring the session.

In block 210, a check is performed to determine if there are any stale entries in the session microcache 22 (i.e., if any entries in the microcache 22 have resided in the microcache 22 for longer than a staleness period). If there are any such entries, they are removed from the session microcache 22 (block 212). The staleness period may be measured by a "microcache maximum response age," which is an amount of time that a particular response is permitted to reside in the session microcache 22 before it is eligible to be discarded based solely on the passage of time. Thus, according to the example of FIG. 5A, if a given response has resided in the session microcache 22 for a predefined time period without the server 16 receiving an indication that the client 12 has received the response, the response is deleted from the session microcache 22. Also, in the example of FIG. 5A, deleting a response comprises deleting a record in the microcache 22 that includes both the response and the correlation ID for the response. The staleness period may be calculated from the time that a request was received, or from the time that a response to a request was written to the session microcache 22, for example.

If a correlation ID is included in the received response list 40, the server 16 assumes that the request linked to that correlation ID will not be submitted again, and that there is no need to keep the response for that correlation ID (or the correlation ID itself) in a response record 26 in the microcache. Therefore, microcache entries corresponding to such requests are deleted (see block 208).

Figure 6:
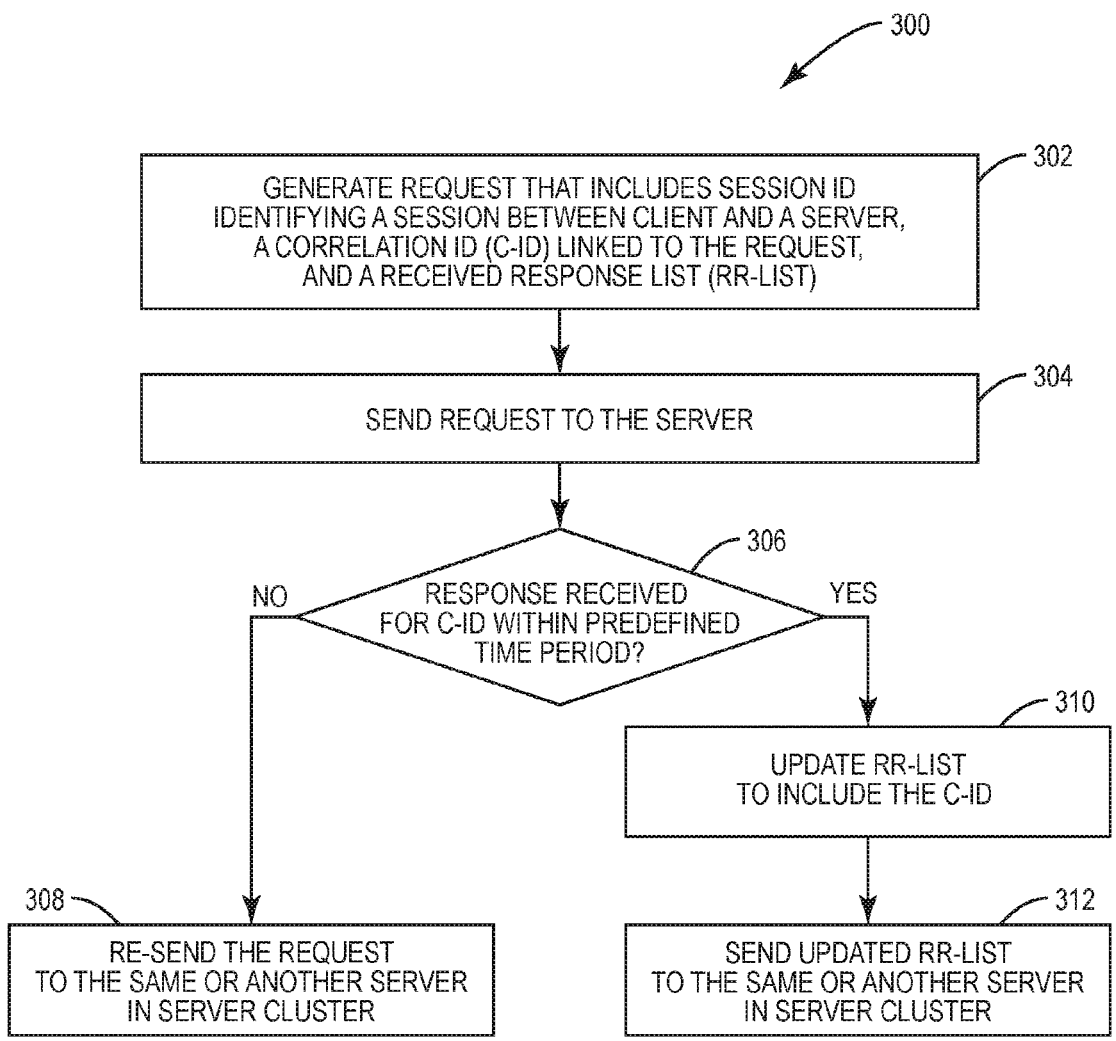
FIG. 6 is a flowchart of a method implemented by a client.

FIG. 6 is a flowchart of a method 300 implemented by a client 12. The client 12 generates a request (block 302) that includes the following:

a session ID that identifies a session between the client 12 and one of a plurality of servers 16 of server cluster 14;
a correlation ID that is linked to the request; and
a response list that contains correlation IDs linked to responses received from one or more servers 16 of the server cluster 14 during the session (e.g., the received response list 40 of FIG. 4).

The client 12 sends the request to the server 16 (block 304). If a response to the request is not received within a predefined time period (a "no" to block 306), then the client 12 re-sends the request to the same or another server 16 of the server cluster 14 (block 308). If a response to the request is received within the predefined time period (a "yes" to block 306), the client 12 updates the response list to include the correlation ID (block 310), and sends the updated response list to the same or another server 16 of the server cluster 14 (block 312).

In one or more embodiments, the phrase "same or another server" in FIG. 6 indicates that the same server 16 is the destination for blocks 304 and 308 if that server was still supporting the session. However, if the session had been transferred to another server 16 in the server cluster 14 at the time of block 308, then the "another" server could be used as the destination in block 308. The phrase "same or another server" could have the same meaning in relation to blocks 304 and 312.

Figure 7:
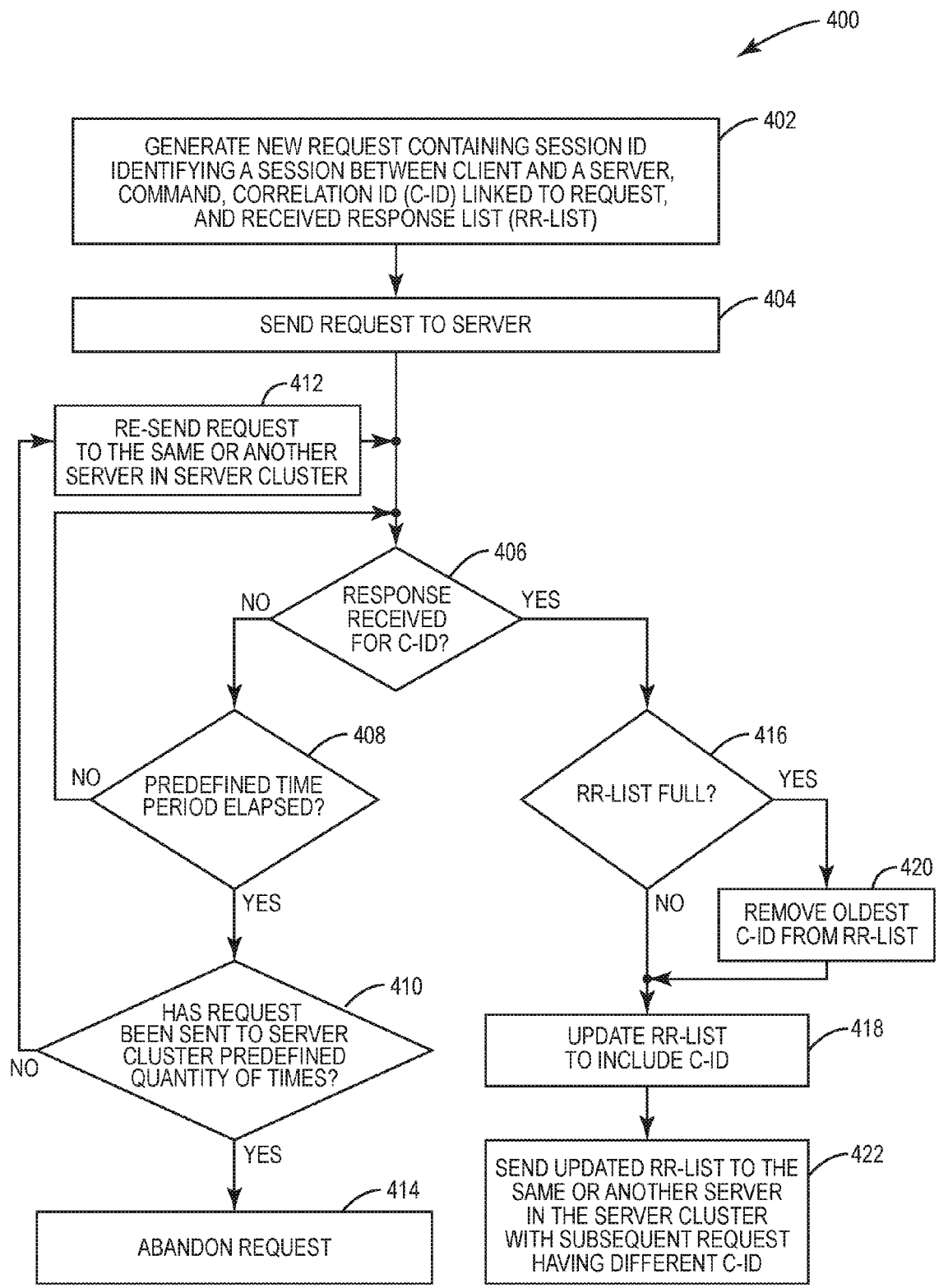
FIG. 7 is a flowchart of an example implementation of the method of FIG. 6.

FIG. 7 is a flowchart of an example implementation 400 of the method 300 of FIG. 6. A new request is generated that contains a session ID identifying a session between a client 12 and a server 16 in the server cluster 14, a command, a correlation ID linked to the request, and a received response list (block 402). The request is sent from the client 12 to the server 16 in the cluster 14 that is supporting a session with the client 12 (block 404). If a response is not received for the correlation ID (a "no" to block 406), a check is performed of whether a predefined time period has elapsed (block 408). If the time period has not elapsed, the client 12 continues to wait for a response. Otherwise, if the predefined time period has elapsed (a "yes" to block 408), and the request has not been sent to the server cluster 14 a predefined quantity of times (a "no" to block 410), the client 12 re-sends the request to the same or another server 16 of the server cluster 14 (block 412). In one or more embodiments, the re-sent request is the exact same request that was sent in block 404. If the predefined time period has elapsed (a "yes" to block 408), and the request has been sent to the server cluster 14 a predefined quantity of times (a "yes" to block 410), then the client abandons the request (block 414). The "predefined quantity of times" here is a maximum amount of retry attempts that a client 12 will send a particular request to a server 16 in the server cluster 14. Thus, in the example of FIG. 7, the request is abandoned if the request has been sent the predefined quantity of times without receiving a response.

In one or more embodiments, the phrase "sent to the server cluster" in relation to block 410 means sent to a server 16 in the server cluster 14 that was supporting the session (e.g., sent to server A while server A was supporting the session, and sent to server B after server A transferred the session to server B). Thus, in one or more embodiments, block 410 considers transmissions of the request to any server 16 in the server cluster 14 if that server 16 was supporting the session at the time the request was transmitted.

If the response is received for the correlation ID (a "yes" to block 406), then the client 12 checks if the received response list is full (block 416). In one or more embodiments, the received response limit has a finite value (e.g., 10 entries) representing a maximum permissible length of the received response list, so that the size of the requests stay within a reasonable size. Without such a limit, the received response list could grow lengthy, and increase request size considerably.

If the received response 40 list is not full, the list is updated to include the correlation ID (block 418). Otherwise, if the received response list 40 is full (a "yes" to block 416), the oldest correlation ID is removed from the received response list 40 (block 420), to make room for the update of block 418. In one example, each entry in the received response list has an associated timestamp to determine which entry is oldest. In one example, the client can simply determine from the values of the correlation IDs in the received response list which correlation IDs are the oldest without analyzing timestamps. Thus, in the example of FIG. 7, the response list 40 contains a predefined quantity of correlation IDs linked to the most recently received responses from the server cluster 14 for the session (i.e., received from servers within the server cluster 14 that support or have supported the session).

The updated received response list 40 is sent to the same or another server 16 of the server cluster 14 as part of a subsequent, different request which is linked to a different correlation ID (block 422). In other embodiments, it would be possible for the updated received response list 40 to be sent on its own, not accompanying another request. In one or more embodiments, the phrase "same or another server" used in connection with block 422 indicates that the same server 16 is the destination for blocks 404 and 422 if that server was still supporting the session. However, if the session had been transferred to another server 16 in the server cluster 14 at the time of block 422, then the "another" server could be used as the destination in block 422. The phrase "same or another server" could have the same meaning in relation to blocks 404 and 412.

As discussed above, upon termination of a session (e.g., a user logging off of an e-commerce website), the microcache 22 for that session may be deleted by the server 16 supporting the session. Likewise, the client 12 may delete its received response list 40 for a session once that session is terminated.

FIG. 8 is a block diagram of an example server 500 that is part of a server cluster, and may be used as one of the servers 16 in the cluster 14. The server 500 is operative to implement the method 100. The server includes a processor 502, a memory circuit 504, and a communication interface 506. The processor 502 comprises one or more processor circuits, including, for example, one or more microprocessors, microcontrollers, or the like, and is configured with appropriate software and/or firmware to carry out one or more of the techniques discussed herein. The memory circuit 504 is configured to store an individual server-specific session microcache 508 for a session between the server 500 and a client (e.g., one of the clients 12 of FIG. 1). The processor 502 is configured to receive a request from the client that includes a session ID identifying a session between the client and the server 500, and a correlation ID that is linked to the request. The processor 502 is further configured to determine whether the correlation ID is included in the session microcache 508 of the session. If the correlation ID is not included in the session microcache 508, the processor 502 processes the request to determine a response, adds the response to the session microcache 508, and sends the response along with an indication of the correlation ID to the client. If the correlation ID and a response to the request are stored in the session microcache 508, the processor 502 re-sends the response along with an indication of the correlation ID to the client. The processor 502 transfers the session ID and session microcache to another of the plurality of servers in the server cluster to continue the session (e.g., using communication interface 506).

The communication interface 506 may be configured according to one or more of the 802.11 standards to communicate through a wired or wireless connection to a data network (e.g., the Internet), for example. Of course this is only an example, and it is understood that the communication interface 506 could be configured to communicate using other standards. For example, the communication interface 506 could be configured as a cellular transceiver that uses one or more cellular standards (e.g., GSM, LTE, CDMA, etc.).

The memory circuit 504 is a non-transitory computer readable medium. In one or more embodiments, the non-transitory computer-readable medium may comprise any computer-readable media, with the sole exception being a transitory, propagating signal. In one or more embodiments, the memory circuit 504 includes one or more of an electronic, magnetic, optical, electromagnetic, or semiconductor-based storage system. The memory circuit 504 may include a portable computer diskette, a hard disk, a random access memory (RAM), a read-only memory (ROM), an erasable programmable read-only memory (EPROM or flash memory), an optical fiber, a portable compact disc read-only memory (CD-ROM), an optical storage drive, a magnetic storage device, or any suitable combination of the foregoing, for example. The memory circuit 504 may include a computer program product 510 which, when executed by the processor 502, configures the server 500 to perform the techniques discussed herein. In one or more embodiments, the server 500 is a single physical device acting as a single one of the servers 16. In one or more embodiments, the server 500 is a single virtual device acting as a single one of the servers 16.

FIG. 9 is a block diagram of an example client 600, and may be used as one of the clients 12 in FIG. 1. The client 600 is operative to implement the method 300. The client 600 includes a processor 602, a memory circuit 604, and a communication interface 606. The processor 602 comprises one or more processor circuits, including, for example, one or more microprocessors, microcontrollers, or the like, and is configured with appropriate software and/or firmware to carry out one or more of the techniques discussed herein. The processor 602 is configured to generate a request that includes: a session ID that identifies a session between the client 600 and one of a plurality of servers of a server cluster (e.g., a server 16 from FIG. 1), a correlation ID that is linked to the request, and a response list that contains correlation IDs linked to responses received from one or more servers of the server cluster for requests submitted by the client as part of the session. As discussed above, the response list may include correlation IDs linked to responses received from other servers 16 in the server cluster 14 that previously supported the session. The processor 602 is configured to send the request to the server. If a response to the request is not received within a predefined time period, the processor 602 re-sends the request to the same or another server of the server cluster (i.e., the same server to which the request was initially sent if that server still supports the session, or a different server if the different server is currently supporting the session). If a response to the request is received within the predefined time period, the processor 602 updates the response list to include the correlation ID, and sends the updated response list to the same or another server of the server cluster (i.e., the same server to which the request was initially sent if that server still supports the session, or a different server if the different server is currently supporting the session). The response list is stored in the memory circuit 604, and is shown in FIG. 9 as "RR-LIST" 608.

The memory circuit 604 is a non-transitory computer readable medium. In one or more embodiments, the non-transitory computer-readable medium may comprise any computer-readable media, with the sole exception being a transitory, propagating signal. In one or more embodiments, the memory circuit 604 includes one or more of an electronic, magnetic, optical, electromagnetic, or semiconductor-based storage system. The memory circuit 604 may include a portable computer diskette, a hard disk, a random access memory (RAM), a read-only memory (ROM), an erasable programmable read-only memory (EPROM or flash memory), an optical fiber, a portable compact disc read-only memory (CD-ROM), an optical storage drive, a magnetic storage device, or any suitable combination of the foregoing, for example. The memory circuit 604 may include a computer program product 610 which, when executed by the processor 602, configures the client 600 to perform the techniques discussed herein. In one or more embodiments, the client 600 is a single physical device acting as a single one of the clients 12. In one or more embodiments, the client 600 is a single virtual device acting as a single one of the clients 12.

As discussed above, by using a microcache 22 for a given session, idempotence can be provided because a request from a client 12 sent to a given one of the servers 16 twice within a session, if provided with the same correlation ID, will yield the same result. Thus, for example, a request to add an item to an electronic shopping cart, when sent twice using the same correlation ID each time within a session, will result in the item being added to the cart only once. This can advantageously add idempotence to otherwise inherently non-idempotent communications between clients and servers over data networks in a multi-client, multi-server environment.

Although a number of point of sale/e-commerce examples have been described above, it is understood that these are only non-limiting examples, and that clients 12 are not limited to being point of sale devices. Instead, the clients 12 could be used for a wide variety of purposes (e.g., managing bank accounts, managing remotely stored files, etc.).

The present disclosure may, of course, be carried out in other ways than those specifically set forth herein without departing from essential characteristics of the present disclosure. For example, it should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. Thus, the present embodiments are to be considered in all respects as illustrative and not restrictive, and all changes coming within the meaning and equivalency range of the appended claims are intended to be embraced therein.

What is claimed is:

1. A method of processing a request received from a client, the method being implemented by one of a plurality of servers in a server cluster and comprising:
  receiving, from the client, a request that includes:
    a session identifier (ID) identifying a session between the client and the server; and
    a correlation ID that is linked to the request;
  determining whether the correlation ID is included in an individual server-specific session microcache of the session;
  if the correlation ID is not included in the session microcache, processing the request to determine a response, adding the response to the session microcache, and sending the response along with an indication of the correlation ID to the client;
  if the correlation ID and a response to the request are stored in the session microcache, re-sending the response along with an indication of the correlation ID to the client; and
  transferring the session ID and session microcache to another of the plurality of servers in the server cluster to continue the session.

2. The method of claim 1, further comprising:
  receiving a response list from the client which contains correlation IDs linked to responses that have been received at the client from one or more servers of the server cluster for requests submitted as part of the session; and
  if responses for any of the correlation IDs in the response list are stored in the session microcache, deleting those responses from the session microcache.

3. The method of claim 2, wherein deleting a response comprises deleting a record in the session microcache that includes both the response and the correlation ID for the response.

4. The method of claim 1, further comprising:
  if a given response has resided in the session microcache for a predefined time period without the server receiving an indication that the client has received the response, deleting the response from the session microcache.

5. The method of claim 1, further comprising:
  starting a timer based on a duplicate request being received; and
  if a response to the duplicate request is not available after the timer indicates that a predefined time period has transpired, sending an error response to the client that includes an indication of the correlation ID for the request.

6. The method of claim 1, further comprising:
  deleting a session microcache based on the session being terminated.

7. A method implemented by a client, comprising:
  generating a request that includes:
    a session identifier (ID) that identifies a session between the client and one of a plurality of servers of a server cluster;
    a correlation ID that is linked to the request; and
    a response list that contains correlation IDs linked to responses received from one or more servers of the server cluster for requests submitted by the client as part of the session;
  sending the request to the server;
  if a response to the request is not received within a predefined time period, re-sending the request to the same or another server of the server cluster; and
  if a response to the request is received within the predefined time period, updating the response list to include the correlation ID, and sending the updated response list to the same or another server of the server cluster.

8. The method of claim 7, wherein the updated response list is sent to the same or another server of the server cluster as part of a subsequent, different request that is linked to a different correlation ID.

9. The method of claim 7, wherein the response list contains a predefined quantity of correlation IDs linked to the most recently received responses for the session.

10. The method of claim 7, further comprising:
  abandoning the request if the request has been sent a predefined quantity of times without receiving a response.

11. A server that is part of a server cluster which includes a plurality of other servers, the server comprising:
  a memory circuit configured to store an individual server-specific session microcache for a session between the server and a client; and
  one or more processing circuits configured to:
    receive, from the client, a request that includes:
      a session identifier (ID) identifying the session between the client and the server; and
      a correlation ID that is linked to the request;
    determine whether the correlation ID is included in the session microcache;
    if the correlation ID is not included in the session microcache, process the request to determine a response, add the response to the session microcache, and send the response along with an indication of the correlation ID to the client;
    if the correlation ID and a response to the request are stored in the session microcache, re-send the response along with an indication of the correlation ID to the client; and
    transfer the session ID and session microcache to another of the plurality of servers in the server cluster to continue the session.

12. The server of claim 11, wherein the one or more processing circuits are further configured to:
  receive a response list from the client which contains correlation IDs linked to responses that have been received at the client from one or more servers of the server cluster for requests submitted by the client as part of the session; and
  if responses for any of the correlation IDs in the response list are stored in the session microcache, delete those responses from the session microcache.

13. The server of claim 12, wherein to delete a response, the one or more processing circuits are configured to delete a record in the session microcache that includes both the response and the correlation ID for the response.

14. The server of claim 11, wherein the one or more processing circuits are further configured to:
if a given response has resided in the session microcache for a predefined time period without the server receiving an indication that the client has received the response, delete the response from the session microcache.

15. The server of claim 11, wherein the one or more processing circuits are further configured to:
start a timer based on a duplicate request being received; and
if a response to the duplicate request is not available after the timer indicates that a predefined time period has transpired, send an error response to the client that includes an indication of the correlation ID for the request.

16. The server of claim 11, wherein the one or more processing circuits are further configured to:
delete a session microcache based on the session being terminated.

17. A client, comprising:
one or more processing circuits configured to:
generate a request that includes:
a session identifier (ID) that identifies a session between the client and one of a plurality of servers of a server cluster;
a correlation ID that is linked to the request; and
a response list that contains correlation IDs linked to responses received from one or more servers of the server cluster for requests submitted by the client as part of the session;
send the request to the server;
if a response to the request is not received within a predefined time period, re-send the request to the same or another server of the server cluster; and
if a response to the request is received within the predefined time period, update the response list to include the correlation ID, and send the updated response list to the same or another server of the server cluster; and
a memory circuit configured to store the response list.

18. The client of claim 17, wherein the updated response list is sent to the same or another server of the server cluster as part of a subsequent, different request that is linked to a different correlation ID.

19. The client of claim 17, wherein the response list contains a predefined quantity of correlation IDs linked to the most recently received responses for the session.

20. The client of claim 17, wherein the one or more processing circuits are further configured to:
abandon the request if the request has been sent a predefined quantity of times without receiving a response.

* * * * *